(12) United States Patent
Kim et al.

(10) Patent No.: US 11,443,171 B2
(45) Date of Patent: Sep. 13, 2022

(54) PULSE GENERATION FOR UPDATING CROSSBAR ARRAYS

(71) Applicant: International Business Machines Corporation, Armonk, NY (US)

(72) Inventors: Seyoung Kim, Gyeongbuk (KR); Oguzhan Murat Onen, Boston, MA (US); Tayfun Gokmen, Briarcliff Manor, NY (US); Malte Johannes Rasch, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 16/929,168

(22) Filed: Jul. 15, 2020

(65) Prior Publication Data
US 2022/0019876 A1  Jan. 20, 2022

(51) Int. Cl.
| G06N 3/04 | (2006.01) |
| G06N 3/063 | (2006.01) |
| G06N 3/08 | (2006.01) |
| G06F 9/30 | (2018.01) |

(52) U.S. Cl.
CPC .......... G06N 3/049 (2013.01); G06F 9/3001 (2013.01); G06F 9/30036 (2013.01); G06N 3/0635 (2013.01); G06N 3/082 (2013.01)

(58) Field of Classification Search
CPC ... G06F 9/3001; G06F 9/30036; G06N 3/049; G06N 3/0635; G06N 3/082
See application file for complete search history.

(56) References Cited

U.S. PATENT DOCUMENTS

| 9,367,798 B2 | 6/2016 | Coenen et al. |
| 9,715,655 B2 | 7/2017 | Wu et al. |
| 9,904,889 B2 | 2/2018 | Eliasmith et al. |
| 9,934,463 B2 | 4/2018 | Seo et al. |
| 10,332,004 B2 | 6/2019 | Kataeva et al. |

(Continued)

FOREIGN PATENT DOCUMENTS

| WO | 2017155544 A1 | 9/2017 |
| WO | 2018228295 A1 | 12/2018 |
| WO | 2019212488 A1 | 11/2019 |

OTHER PUBLICATIONS

Yeo, Injune, et al. "A CMOS-based Resistive Crossbar Array with Pulsed Neural Network for Deep Learning Accelerator." 2019 IEEE International Conference on Artificial Intelligence Circuits and Systems (AICAS). IEEE, 2019. (Year: 2019).*

(Continued)

*Primary Examiner* — Benjamin P Geib
(74) *Attorney, Agent, or Firm* — Cantor Colburn LLP; Erik Johnson

(57) ABSTRACT

Provided are embodiments for a computer-implemented method, a system, and a computer program product for updating an analog crossbar array. Embodiment include receiving a number used in matrix multiplication to represent using pulse generation for a crossbar array, and receiving a bit-length to represent the number. Embodiments also include selecting pulse positions in a pulse sequence having the bit length to represent the number, performing a computation using the selected pulse positions in the pulse sequence, and updating the crossbar array using the computation.

25 Claims, 11 Drawing Sheets

(56) References Cited

U.S. PATENT DOCUMENTS

| | | | |
|---|---|---|---|
| 10,373,051 B2 | 8/2019 | Gokmen et al. | |
| 10,476,487 B2 | 11/2019 | Roy et al. | |
| 2016/0049195 A1* | 2/2016 | Yu | G11C 13/003 |
| | | | 365/63 |
| 2016/0267378 A1 | 9/2016 | Eleftheriou et al. | |
| 2016/0342904 A1 | 11/2016 | Merkel et al. | |
| 2017/0011290 A1 | 1/2017 | Taha et al. | |
| 2017/0109626 A1 | 4/2017 | Gokmen et al. | |
| 2018/0060726 A1 | 3/2018 | Gokmen et al. | |
| 2018/0075338 A1 | 3/2018 | Gokmen | |
| 2018/0300627 A1* | 10/2018 | Gokmen | G06N 3/063 |
| 2018/0373981 A1 | 12/2018 | Hu et al. | |
| 2019/0057301 A1 | 2/2019 | Pantazi et al. | |
| 2019/0122105 A1 | 4/2019 | Boybat et al. | |
| 2019/0197391 A1 | 6/2019 | Chen et al. | |
| 2019/0228287 A1 | 7/2019 | Okazaki et al. | |

OTHER PUBLICATIONS

Hasan, Raqibul, Tarek M. Taha, and Chris Yakopcic. "On-chip training of memristor crossbar based multi-layer neural networks." Microelectronics Journal 66 (2017): 31-40. (Year: 2017).*

International Search Report and Written Opinion for Application No. PCT/EP2021/067834 dated Oct. 6, 2021, 11 pages.

List of IBM Patents or Patent Applictions Treated as Related; (Appendix P), Filed Jul. 15, 2020, 2 pages.

U.S. Appl. No. 16/929,172, filed Jul. 15, 2020; Entitled: "Sparse Modifiable Bit Length Determinstic Pulse Generation for Updating Analog Crossbar Arrays"; First Named Inventor: Seyoung Kim.

Wang et al., "Stochastic Sparse Learning with Momentum Adaptation for Imprecise Memristor Networks", https://arxiv.org/pdf/1906.02393.pdf, Jun. 6, 2019, 8 pages.

International Search Report and Written Opinion for Application No. PCT/EP2021/067846 dated Oct. 15, 2021, 11 pages.

* cited by examiner

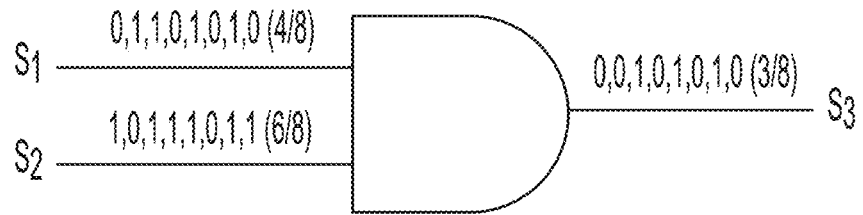
FIG. 5
$$i = g(s,v)v \qquad \text{EQUATION [1]}$$
$$\frac{\partial s(t)}{\partial t} = f(s,v) \qquad \text{EQUATION [2]}$$
FIG. 6
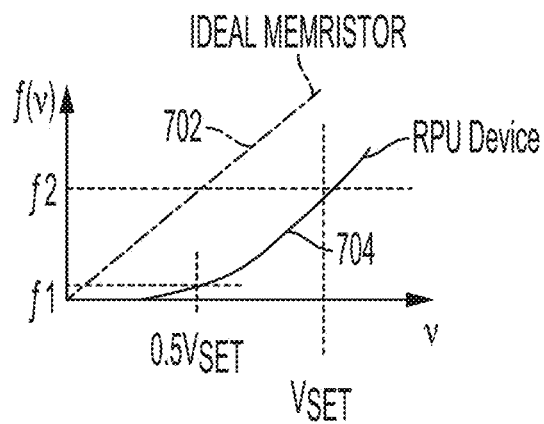
FIG. 7

$Vector = 1:\min(b, b^2 / compression)$
$Map = \text{round}((vector \otimes vector) * \min(compression, b/compression) - \varepsilon)$
$Shifted\_map = [map(2 : end, : ; zeros(1, \min(b, b^2 / compression)))];$
$\delta = map \oplus Shifted\_map$ For $t = 1 : \min(b, b^2 / compression)$
    $x(1: t, t) = 1$
End

FIG. 9

PULSE GENERATION FOR UPDATING CROSSBAR ARRAYS

BACKGROUND

The present invention generally relates to crossbar arrays that implement neural networks, and more specifically, to training neural networks using compact fixed bit length deterministic pulse generation for updating analog crossbar arrays.

Artificial neural networks (ANNs), also known as neuromorphic and synaptronic systems, are computational systems that permit electronic systems to essentially function in a manner analogous to that of biological neural systems such as a human brain. In this detailed description, any reference to an ANN is used in the broadest sense to cover a wide range of computer and electronic systems that model biological neural networks, including but not limited to pulsed neural networks (PNNs). Some implementations of ANNs do not generally utilize the traditional digital model of manipulating zeros and ones. Instead, some implementations of ANNs create connections between processing elements that are roughly functionally equivalent to neurons of a biological brain.

ANNs are often implemented as relatively large, parallel computing systems having many simple processors with many interconnections. Modeling a biological nervous system using ANNs (or PNNs) can contribute to a better understanding of biological functions. Many ANN models attempt to use some "organizational" principles believed to be used in the human brain. Contemporary computer hardware technology (such as VLSI and optical) has made such modeling feasible. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

A contemporary ANN includes a network of artificial neurons (also known as "nodes"). These nodes are connected to each other, and the strength of their connections to one another is assigned a value. For example, connections can be identified as exhibiting inhibition (maximum inhibition being negative 1.0) or excitation (maximum excitation being plus 1.0). If the magnitude value of the connection is high, this indicates a strong connection. Within each node's design, a transfer function is also built in. There are three types of neurons in a typical ANN, namely input nodes, hidden nodes and output nodes.

Input nodes take in information that can be numerically expressed. The information is presented as activation values, wherein each node is given a number, and a number having a higher magnitude causes a greater activation. This information is then passed throughout the network. Based on the connection strengths (weights), inhibition (or excitation), and transfer functions, the activation value is passed from node to node. Each node sums the activation values it receives. Each node than modifies the value based on its transfer function. The activation flows through the input nodes and the hidden layers until it reaches the output nodes. The output nodes reflect the input in a meaningful way to the outside world.

There are many types of neural networks, but the two broadest categories are feed-forward and feed-back networks. A feed-forward network is a non-recurrent network having inputs, outputs, and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feed-back network includes feed-back paths, which means that their signals can travel in both directions using loops. All possible connections between neurons are allowed. Because loops are present in this type of network, under certain operations, it can become a non-linear dynamical system that changes continuously until it reaches a state of equilibrium. Feed-back networks are often used in associative memories and optimization problems, wherein the network looks for the best arrangement of interconnected factors.

In an ANN, a spike generation function can be modeled by a component known generally as a temporal encoder or a spike generator. Thus, the ability to gain greater knowledge of the previously describe biological neural system depends on the development of ANNs that model how neural information is encoded in recurrent networks of spiking temporal encoders. Temporal encoders provide an alternative to both digital and analog encoding of information by integrating received signals asynchronously and producing subsequent sets of asynchronous pulsed signals. Certain configurations of temporal encoder networks allow for extraction of information about sets of signals input to the network from sets of pulses or spikes output from the network.

SUMMARY

Embodiments of the present invention are directed to a computer-implemented method of pulse generation for updating crossbar arrays. A non-limiting example of the computer-implemented method includes receiving a number used in matrix multiplication to represent using pulse generation for a crossbar array, and receiving a bit-length to represent the number. The computer-implemented method also includes selecting pulse positions in a pulse sequence having the bit length to represent the number, performing a computation using the selected pulse positions in the pulse sequence, and updating the crossbar array using the computation.

Embodiments of the present invention are directed to a system for generating pulses for updating crossbar arrays. A non-limiting example of the system includes a crossbar array having one or more memristive devices and a processor. The processor is configured to receive a number used in matrix multiplication to represent using pulse generation for the crossbar array, and receive a bit-length to represent the number. The processor is also configured to select pulse positions in a pulse sequence having the bit length to represent the number, perform a computation using the selected pulse positions in the pulse sequence, and update the crossbar array using the computation, wherein updating the crossbar array changes weights of the one or more memristive devices.

Embodiments of the invention are directed to a computer program product for pulse generation for updating crossbar arrays, the computer program product including a computer readable storage medium having program instructions embodied therewith. The program instructions are executable by a processor to cause the processor to perform a method. A non-limiting example of the method includes receiving a number used in matrix multiplication to represent using pulse generation for a crossbar array, and receiving a bit-length to represent the number. The method also includes selecting pulse positions in a pulse sequence having the bit length to represent the number, performing a computation using the selected pulse positions in the pulse sequence, and updating the crossbar array using the computation.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a block diagram for a computing methodology capable of being used in one or more embodiments of the invention;

FIG. 6 depicts known equations that govern the operation of a passive, two-terminal memristor capable of being utilized in connection with embodiments of the invention;

FIG. 7 depicts a graphical comparison between switching characteristic of a known two-terminal memristor and the non-linear switching characteristic of a two-terminal RPU capable of being utilized in connection with embodiments of the invention;

FIG. 9 depicts an algorithm for selecting bit positions in a bit stream in accordance with one or more embodiments of the invention;

Figure 1:
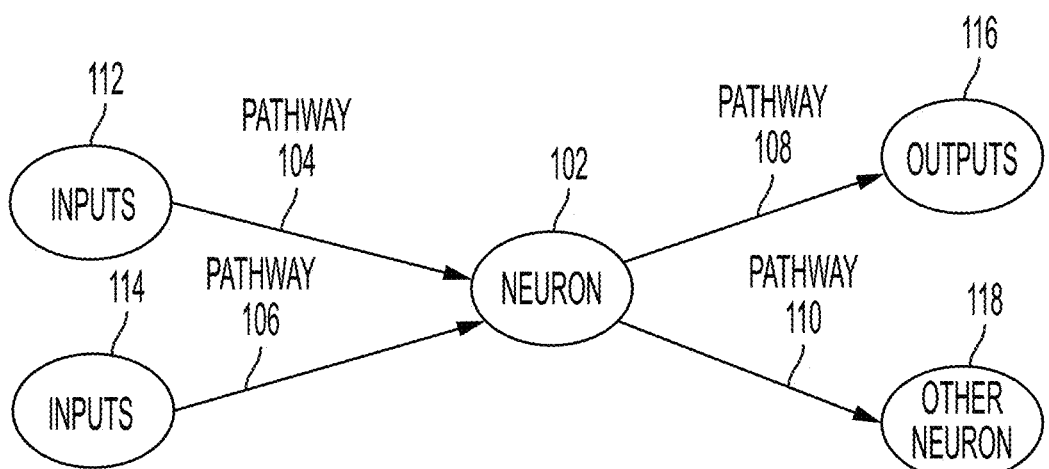
FIG. 1 depicts a diagram of input and output connections of a biological neuron that is modeled using embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment of the invention described herein as "exemplary" is not necessarily to be construed as preferred or advantageous over other embodiments of the invention. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 2:
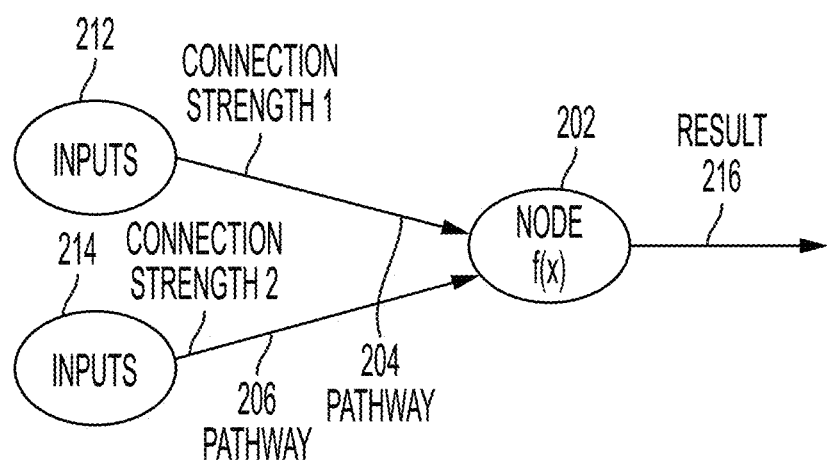
FIG. 2 depicts a model of the biological neuron shown in FIG. 1 capable of being used in connection with embodiments of the invention.
Figure 3:
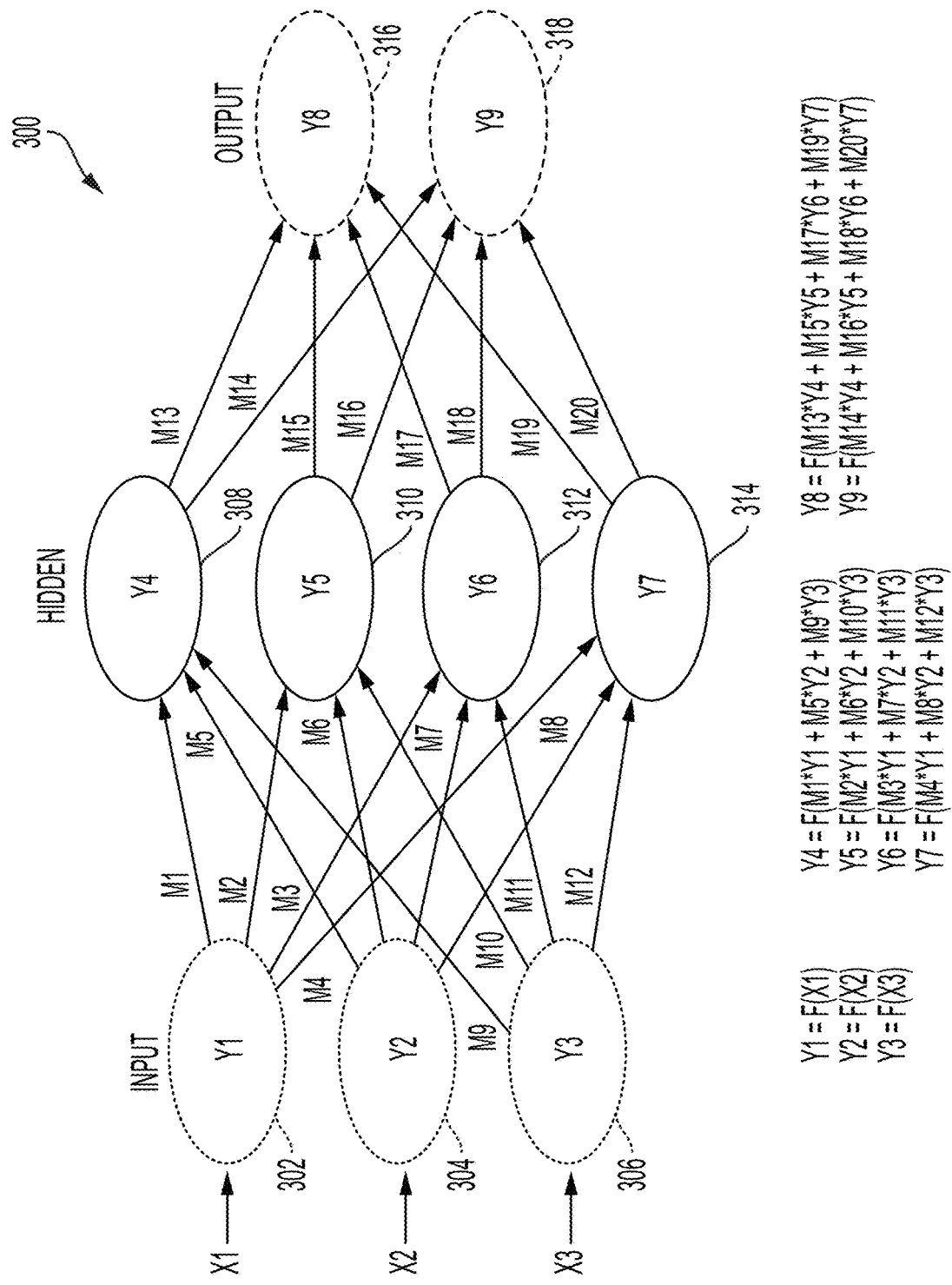
FIG. 3 depicts a model of an ANN incorporating the biological neuron model shown in FIG. 2.

Turning now to an overview of technologies that are more specifically relevant to aspects of the invention, a description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream outputs 116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which can be a final output or an input to another node, or both. In the present detailed description, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers can be provided.

Similar to the functionality of a human brain, each input layer node 302, 304, 306 of ANN 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein* represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

Figure 4:
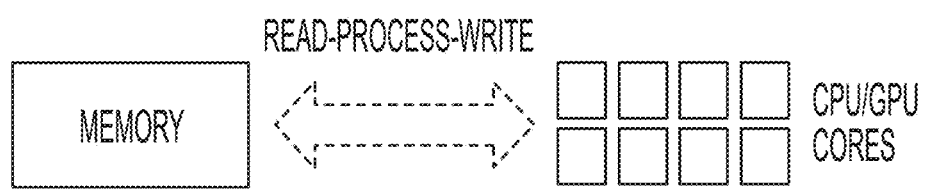
FIG. 4 depicts a block diagram of a known weight update methodology capable of be used in connection with embodiments of the invention.

Notwithstanding the potential for lower power consumption, executing offline training can be difficult and resource intensive because it is typically necessary during training to modify a significant number of adjustable parameters (e.g., weights) in the ANN model to match the input-output pairs for the training data. FIG. 4 depicts a simplified illustration of a typical read-process-write weight update operation, wherein CPU/GPU cores (i.e., simulated "neurons") read a memory (i.e., a simulated "synapse") and perform weight update processing operations, then write the updated weights back to memory. Accordingly, simplifying the crosspoint devices of ANN architectures to prioritize power-saving, offline learning techniques typically mean that training speed and training efficiency are not optimized.

Stochastic computing is a collection of techniques that represent continuous values by streams of random bits, wherein complex computations can be computed by simple bit-wise operations on the streams. Specifically, if there are two random and independent bit streams S1, S2 called stochastic numbers (i.e., a Bernoulli process), wherein the probability of a "one" in the first stream is p, and the probability of a "one" in the second stream is q, the logical AND of the two streams can be taken as shown in FIG. 5. The probability of a "one" in the output stream is pq. By observing enough output bits and measuring the frequency of "ones," it is possible to estimate pq to arbitrary accuracy. Because of the design of the "multiply and accumulate" operations, which can be implemented with a few logic gates/transistors, stochastic computing is often used in the hardware design for neural networks.

However, in some stochastic techniques, the necessary weights for the computations are supplied to the systolic array from external locations, and updates to the weights are not performed by the array. This only addresses the acceleration of vector-matrix multiplication or matrix-matrix multiplication operations that are heavily used during neural network training. However, systolic arrays without local storage cannot perform the weight updates in parallel because the weights are stored at an external memory location. Accelerating the weight updates is necessary in order to accelerate the overall learning algorithm as provided by the embodiments of the techniques described herein.

In addition, training the ANN requires many computations to be performed. As the number of nodes increases the complexity and number of computations increase which can lead to further inefficiencies in training speed and accuracy. In order to compute the outer product used for adjusting the weights, it is inefficient to send $b^2$ pulses to form the outer product, where b represents the number of bits.

Turning now to an overview of the aspects of the invention, one or more embodiments of the invention address the above-described shortcomings of the prior art by providing an efficient neural network training scheme. The techniques of the embodiments of the invention described herein reduce the number of pulses (or bit length) that are used to represent each number used in the outer-product based matrix update matrix multiplication. The reduced bit length determines the precision of the outer-product based matrix update. However, the reduction can lead to a loss of information and must be optimized. Granularity in the multiplication performed within the outer-product-based update can be introduced by the reduction in the number of pulses can impact the accuracy of the neural network. Therefore, the selected position of pulse in the pulse sequence is highly critical and must be strategically selected to maintain the contours presented in the true multiplication map for the values.

The bit selection for the pulse sequence or bit stream that represent the numbers is mapped to the outer product used for training the neural network. The technical effects and benefits of the embodiments of the invention described herein provide an accurate representation of the bit-wise multiplication performed in conventional neural network updates. The technical effects and benefits also provide an efficient way to encode the multiplication using only b bits of the pulse sequence with minimal error. To optimize the multiplication, an algorithm in accordance with aspects of the invention provides the smallest representation that is sufficient to compute the outer product for updating the one or more memristors of the crossbar array. Providing an algorithm to generate the pulse positions for the values used in the matrix multiplication can accelerate the speed and efficiency of training ANN architectures, as well as improve the overall ANN performance and allow a broader range of ANN applications.

The term "memristor" is used to describe a passive two-terminal electrical component, wherein the resistance value of the device depends on the history of the voltages that have previously been applied to the device. The operation of a memristor is governed by Equations [1] and [2] shown in FIG. 6, wherein i is the current passing through the device, v is the voltage applied to the device, g is the conductance value of the device (which is the inverse of the resistance), s is the internal state variable of the device that controls the conductance value and f is the function that shows the time evolution of the internal state variable s.

The memristor behavior of a crossbar array according to embodiments of the invention is depicted in FIG. 7. To illustrate the difference between an ideal memristor and a non-ideal, non-linear memristor that can be used to implement the disclosed RPU, FIG. 7 is a graph illustrating a comparison between the voltage switching behaviors of an ideal memristor and an RPU in accordance with embodiments of the present invention. The vertical axis of the graph represents device state change at a particular voltage, and the horizontal axis of the graph represents the voltage applied. In an ideal memristor operation, a change in resistance is linearly proportional to the voltage applied to the device. Thus, as soon as the memristor sees any voltage, its resistance state changed. This is shown by curve 702, which shows that the change in state is dramatic even at low voltages.

For non-linear RPU devices as shown by the curve 704, there is a well-defined set voltage, VSET, that the device needs to experience in order to change its internal resistance state. A bias voltage of 0.5VSET will not change the internal resistance state. In embodiments of the present invention, this non-linear characteristic of the RPU device is exploited to perform multiplication locally. Assuming f1 is small, the device will not change its internal state when only 0.5VSET is applied. Notably, FIG. 7 illustrates positive voltages and positive changes to the resistive state of the RPU device, however, a similar relationship between negative voltages and negative resistance changes also exists.

Figure 8:
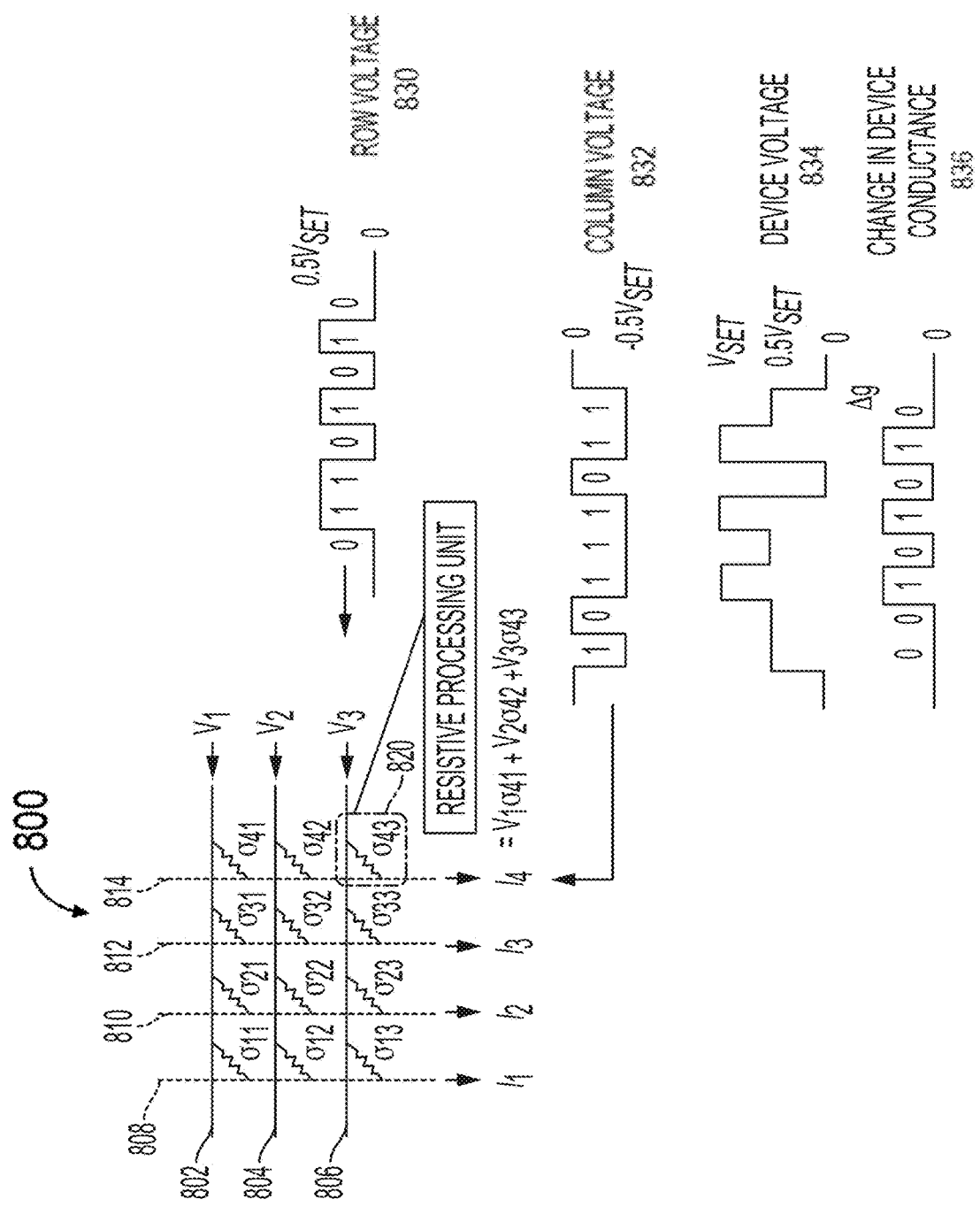
FIG. 8 depicts a crossbar array of two-terminal, non-linear RPU devices according to embodiments of the invention, along with voltage sequences illustrating the operation of the RPU.

Turning now to a more detailed description of aspects of the present invention, FIG. 8 is a diagram of a two-dimensional (2D) crossbar array 800 that performs forward matrix multiplication, backward matrix multiplication and weight updates according to embodiments of the present invention. Crossbar array 800 is formed from a set of conductive row wires 802, 804, 806 and a set of conductive column wires 808, 810, 812, 814 that intersect the set of conductive row wires 802, 804, 806. The intersections between the set of row wires and the set of column wires are separated by RPUs, which are shown in FIG. 8 as resistive elements each having its own adjustable/updateable resistive weight, depicted as σ11, σ21, σ31, σ41, σ12, σ22, σ32, σ42, σ13, σ23, σ33 and σ43, respectively. For ease of illustration, only one RPU 820 is labeled with a reference number in FIG. 8. In forward matrix multiplication, the conduction state (i.e., the stored weights) of the RPU can be read by applying a voltage across the RPU and measuring the current that passes through the RPU.

Input voltages V1, V2, V3 are applied to row wires 802, 804, 806, respectively. Each column wire 808, 810, 812, 814 sums the currents I1, I2, I3, I4 generated by each RPU along the particular column wire. For example, as shown in FIG. 8, the current I4 generated by column wire 814 is according to the equation I4=V1σ41+V2σ42+V3σ43. Thus, array 800 computes the forward matrix multiplication by multiplying the values stored in the RPUs by the row wire inputs, which are defined by voltages V1, V2, V3. The backward matrix multiplication is very similar. In backward matrix multiplication, voltages are applied at column wires 808, 810, 812, 814 then read from row wires 802, 804, 806. For weight updates, which are described in greater detail below, voltages are applied to column wires and row wires at the same time, and the conductance values 836 stored in the relevant RPU devices all update in parallel. Accordingly, the multiplication and addition operations required to perform weight updates are performed locally at each RPU 820 of array 800 using the RPU device itself plus the relevant row or column wire of array 800. Thus, in accordance with embodiments of the present invention, no read-update-write cycles (shown in FIG. 4) are required in array 800.

Continuing with the diagram of FIG. 8, in accordance with one or more embodiments of the invention, the operation of a positive weight update methodology for RPU 820 and its corresponding weight σ33 at the intersection of conductive row wire 806 and conductive column wire 812 will now be provided. The non-linear characteristics of RPU 820 are used to perform multiplication operations locally at RPU 820 using computing as described below. More specifically, the disclosed methodology uses the non-linear switching characteristics of RPU 820 and bit streams 830, 832 to perform multiplication operations and the necessary weight updates locally at RPU 820 without the necessity of other circuit elements. Update generator circuitry (not shown) is provided at the periphery of crossbar array 800 and used as a peripheral "translator" in order to generate necessary voltage pulses in the form of bit streams (e.g., 830, 832) that would be applied to all RPUs of 2D crossbar array 800 in parallel.

Referring briefly to the diagram of FIG. 7, it is assumed that $f_1$ for RPU 820 shown in FIG. 8 is very small (e.g., $f_1$=0) which means that RPU 820 does not change its internal state when only 0.5 VSET is applied to it. A row voltage sequence or bit stream 830, which is applied to row wire 806, is shown as a sequence of voltage pulses representing weight updates having a voltage of zero or a voltage of +0.5 VSET. A column voltage sequence or bit stream 832, which is applied to column wire 814, is shown as a sequence of voltage pulses also representing weight updates having either a voltage of zero or a voltage of −0.5 VSET. In example of FIG. 8, 4/8 is encoded by row voltage sequence 830, and 6/8 is encoded by column voltage sequence 832. The example voltage sequences 830, 832 represent a positive resistance change phase of the weight update. After the positive weight updates are performed, a separate set of sequences with the polarity of the respective voltages reversed can be used to update weights in a negative direction for those weights that need such correction.

Voltage sequence 834 is the voltages applied to RPU 820 resulting from the difference between row voltage sequence 830 and column voltage sequence 832. Voltage sequence 834 will have 3 voltage steps at 0V, 0.5VSET and VSET. However, because the resistance σ43 of RPU 820 only changes for device voltages reaching VSET, a single pulse either send through a column wire or a row wire is not enough to change the resistance state of RPU 820. When a column wire sends a voltage at 0.5VSET, and a row wire sends a voltage at −0.5VSET, the resulting VSET pulse applied to the relevant RPU will cause an incremental change in the resistance of the device. Accordingly, the voltage pulses applied to RPU 820 utilize the non-linear switching characteristic of RPU 820 in order to perform a bit wise AND operation (e.g., as shown in FIG. 5) locally at RPU 820. Hence, the resulting change in the stored weight (e.g., σ43) of the RPU is proportional to the product of the two numbers (4/8*6/8=⅜) "translated" by update generator circuitry, which is peripheral to crossbar array 800.

In accordance with one or more embodiments of the invention, an algorithm 900 for performing multiplication with pulse coincidence is shown in FIG. 9. In particular, the algorithm 900 generates the pulse positions in the pulse sequence for the δ values to optimize the weights for updating the crossbar array. The variables used in the algorithm 900 include the variable b which is the number of different x and δ values in the matrix w; compression is a compression factor; ε is a margin of error; t is a counter variable that runs from 1 to min($b^2$,$b^2$/compression). The uncompressed set is achieved when the b-bit resolution is equal to $b^2$. Any value less than $b^2$ corresponds to a compression of how the bits are represented (since there will be information loss). The algorithm 900 is directed to performing the compression with the least amount of penalty.

The weight update is performed by calculating a vector-vector outer product (as shown above) for the weight matrix which is similar to a multiplication operation. After the calculation an incremental weight update is applied at each processing component using the updated calculation. The methodology described above determines the pulse locations in the pulse sequence for the δ values of the matrix w. A first pulse sequence representing the number for the x value is multiplied with a second pulse sequence representing the number for the δ value. The pulse positions for the δ value can be represented in a graph such as graph 1004 (discussed further with reference to FIG. 10). Using the pulse sequence from the algorithm 900, the multiplication is simplified and reduces the overall number of computations required to perform the weight update.

Figure 10:
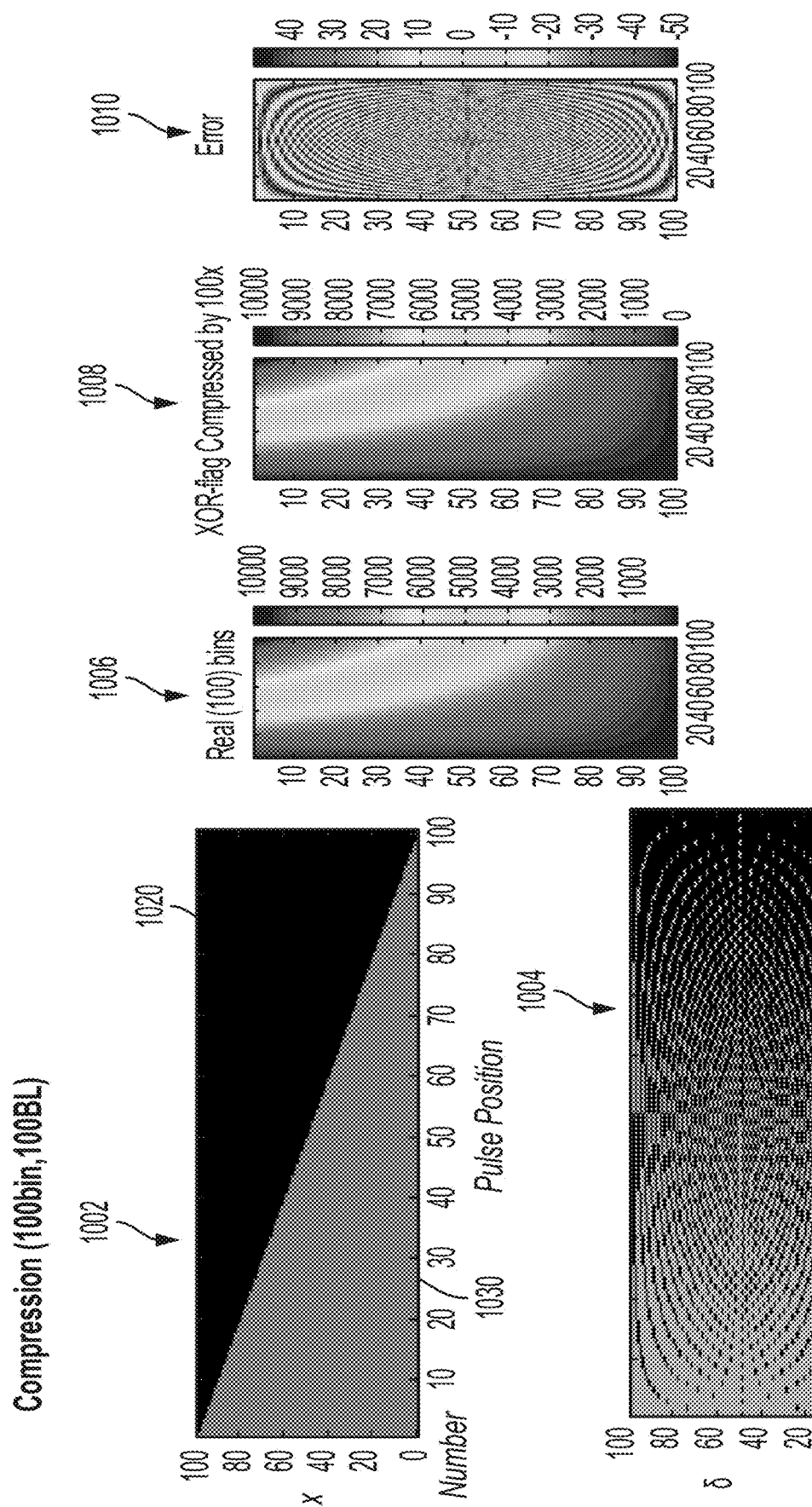
FIG. 10 depicts graphs and multiplication maps in accordance with one or more embodiments of the invention.

FIG. 10 depicts a series of graphs and maps for an example implementation for the pulse generation to update a crossbar array in accordance with one or more embodiments of the invention. In this non-limiting example, there are b bins where b bins indicate the x and δ values for a weight matrix w can each take on 100 different values. Here, the b bins are 100 and the bit length (BL) is 100 bits. Conventionally, in order to represent the different numbers for x and δ, $b^2$ number of computations are required to perform an update of the weights used in the neural network because an element-wise multiplication update is performed for each element (x and δ). Using the methodology described in FIG. 9, the compression reduces the $b^2$ number of computations to b number of computations for performing the weight update for the neural network which exhibits similar results as the element-wise multiplication.

In FIG. 10, the graph 1002 represents the x values in the weight matrix used in performing the updates for the neural network. The x-axis of the graph 1002 represents the pulse position in the pulse sequence or the bit position in the bit stream. The y-axis of the graph 1002 represents the numbers for the x values that will be represented by the pulse sequence. The pulse sequence or bit stream can be represented with a series of 1's and zeroes. The regions 1020 represent 1's (logic high) and the regions 1030 represent zeros (logic low). For example, in graph 1002, the row corresponding to the x value of 80 indicates the positions in the pulse sequence the number 80 is represented with the pulses provided in the positions shown on the x-axis. In another example, the bottom row of graph 1002 corresponding to the number 0 is represented with 100 zero-pulses in the pulse sequence and the top row corresponding to 1 is represented by 100 1's in the pulse sequence.

The pulse sequence generated for the x-values and δ delta values are quite different. Therefore, the pulse sequence for the δ values are determined differently than the pulse sequence for the x values and is determined using the algorithm 900 discussed with reference to FIG. 9. In FIG. 10, the graph 1004 represents the pulse positions in the pulse sequence for the δ values. Similar to graph 1002, the x-axis of the graph 1004 represents the pulse position and the y-axis represents the number for the δ value that is to be used in computation for the update of the weights.

Still referring to FIG. 10, the multiplication map 1006 represents a true multiplication map where an element-wise multiplication is performed for each and every element ($x_i$, $\delta_j$) in the weight matrix w. The true multiplication map 1006 provides contours that correspond to the element-wise multiplication. In this example, 10,000 pulses/bits are used to represent each number for performing the matrix multiplication for updating the weights of an analog crossbar array, where the x value is 100 bits and the δ value is 100 bits. As the number of bits increases, the complexity and number of computations quickly increases.

Also shown in FIG. 10 is a heat map 1008 that is generated by taking an outer product for a number for the x-value represented by a first pulse sequence and a number for the δ value represented by a second pulse sequence, where the second pulse sequence for the δ value was determined from the algorithm shown in FIG. 9. The heat map 1008 allows for an intuitive analysis of the approximation of the outer product of the first pulse sequence and the second pulse sequence to the element-wise multiplication of each and every combination of x and δ.

As shown in the heat map 1008, the outer-product enables the representations of the element-wise multiplication to be represented with only 100 bits instead of 10,000 bits when the true multiplication is performed for each and every element. By comparing the multiplication map 1006 to the heat map 1008, an error can be computed by taking the difference between the corresponding values. As shown in FIG. 10, an error map 1010 is computed and can be displayed. The contours of the heat map 1008 are similar to the contours shown in the multiplication map 1006 and the similarity indicates the representation will provide an efficient update and accurate classification for the neural network using the outer product.

As the number of representations are reduced from the true multiplication map, the heat map 1006 will become more and more granular which can lead to inaccurate results. However, an optimal reduction can be performed to obtain bit representations that maintain the integrity of the results from the neural network as when using the true multiplication map to perform the update to the neural network. In one or more embodiments of the invention, the optimal reduction is realized when the BL is set to be equal to b.

Figure 11:
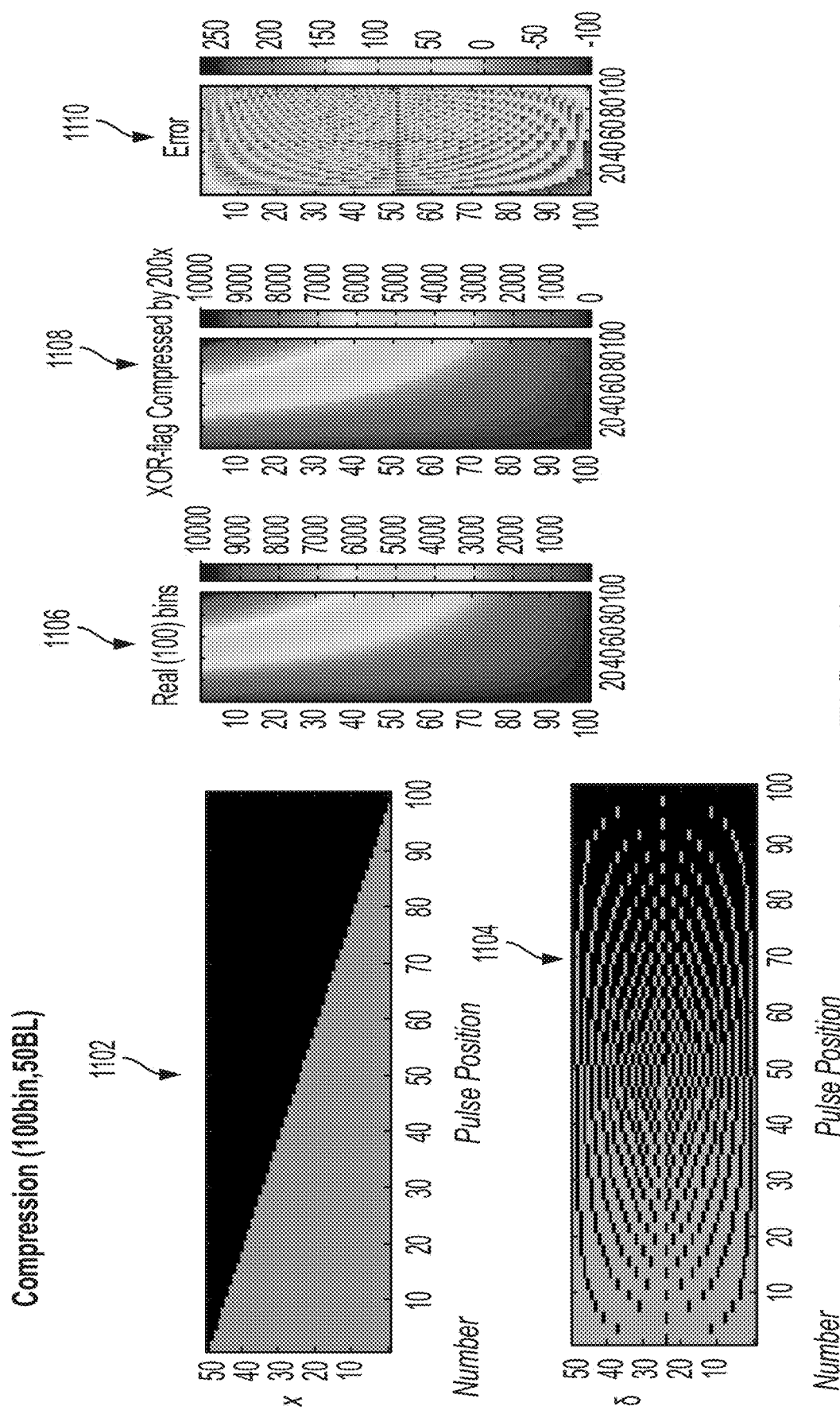
FIG. 11 depicts graphs and multiplication maps in accordance with one or more embodiments of the invention.

In FIG. 11 a configuration having a bin 100 and a bit length of 50. Similar to FIG. 10, the graph 1102 represents the pulse sequence for each x value and the graph 1104 represents the pulse sequence for each δ value the will be used in updating the neural network. When compared to FIG. 10, the BL is 50 which is less than that of FIG. 10. Because more values of x and δ are mapped to the true multiplication map 1006 with a shorter BL, some granularity is introduced into the heat map 1108 as the number of representations exceed the BL used for the update. Additionally, the error map 1110 is indicating a larger differences between the true multiplication map 1006 and the heat map 1008.

Figure 12:
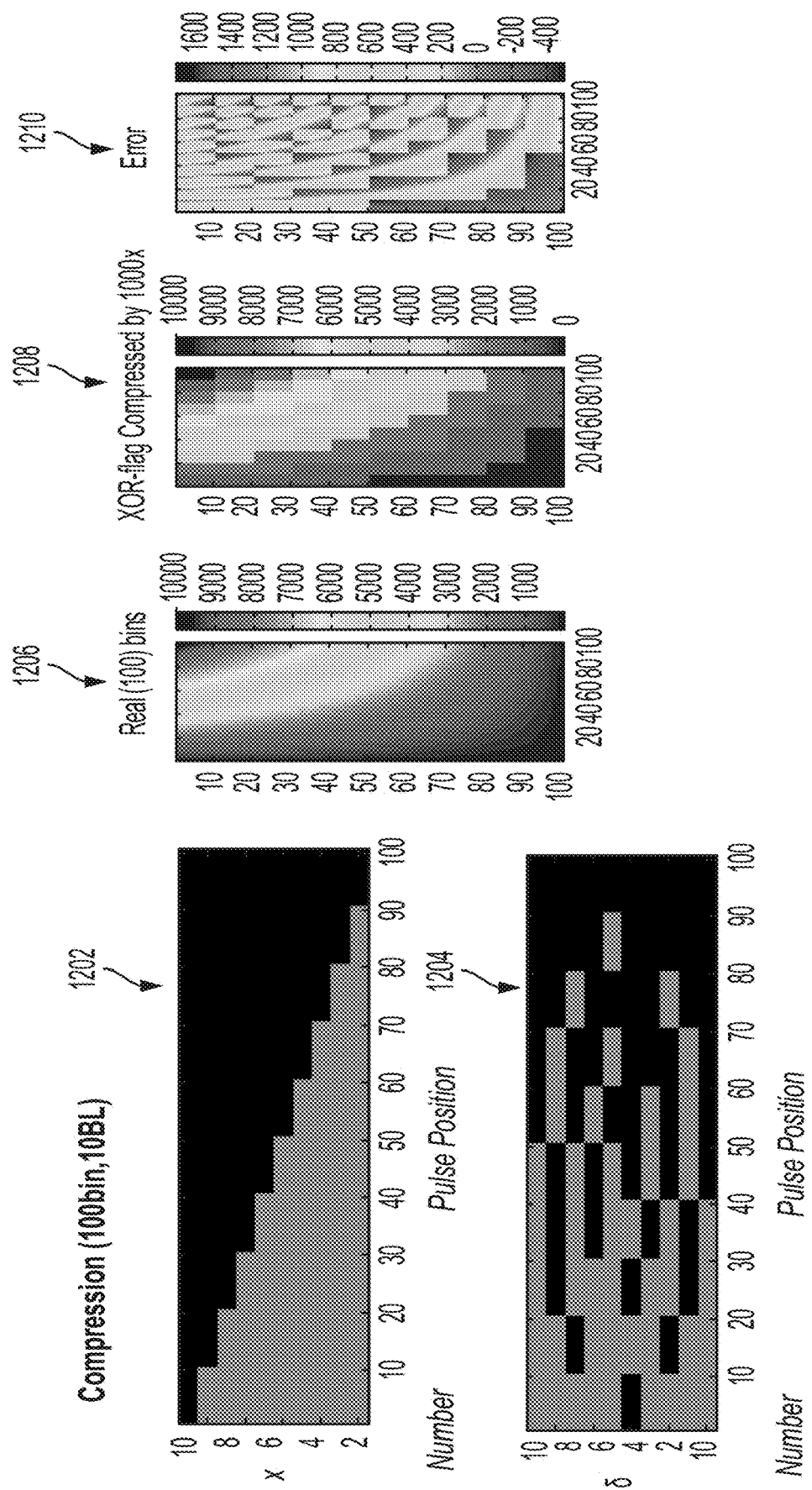
FIG. 12 depicts graphs and multiplication maps in accordance with one or more embodiments of the invention.

Referring to FIG. 12, the BL that is used to represent x and δ values of the weight matrix w is reduced even further to a BL of 10 while maintaining a bin of 100 when compared to FIG. 11. The graph 1202 represents the pulse sequence for each x value and the graph 1204 represents the pulse sequence for each δ value. As can be seen by comparing the true multiplication map 1206 to the heat map 1208 more granularity is introduced into the heat map 1208 which indicates a reduction in the accuracy of the update. FIG. 12 further illustrates an example where the granularity is increased with the decreased BL used to represent each value.

Figure 13:
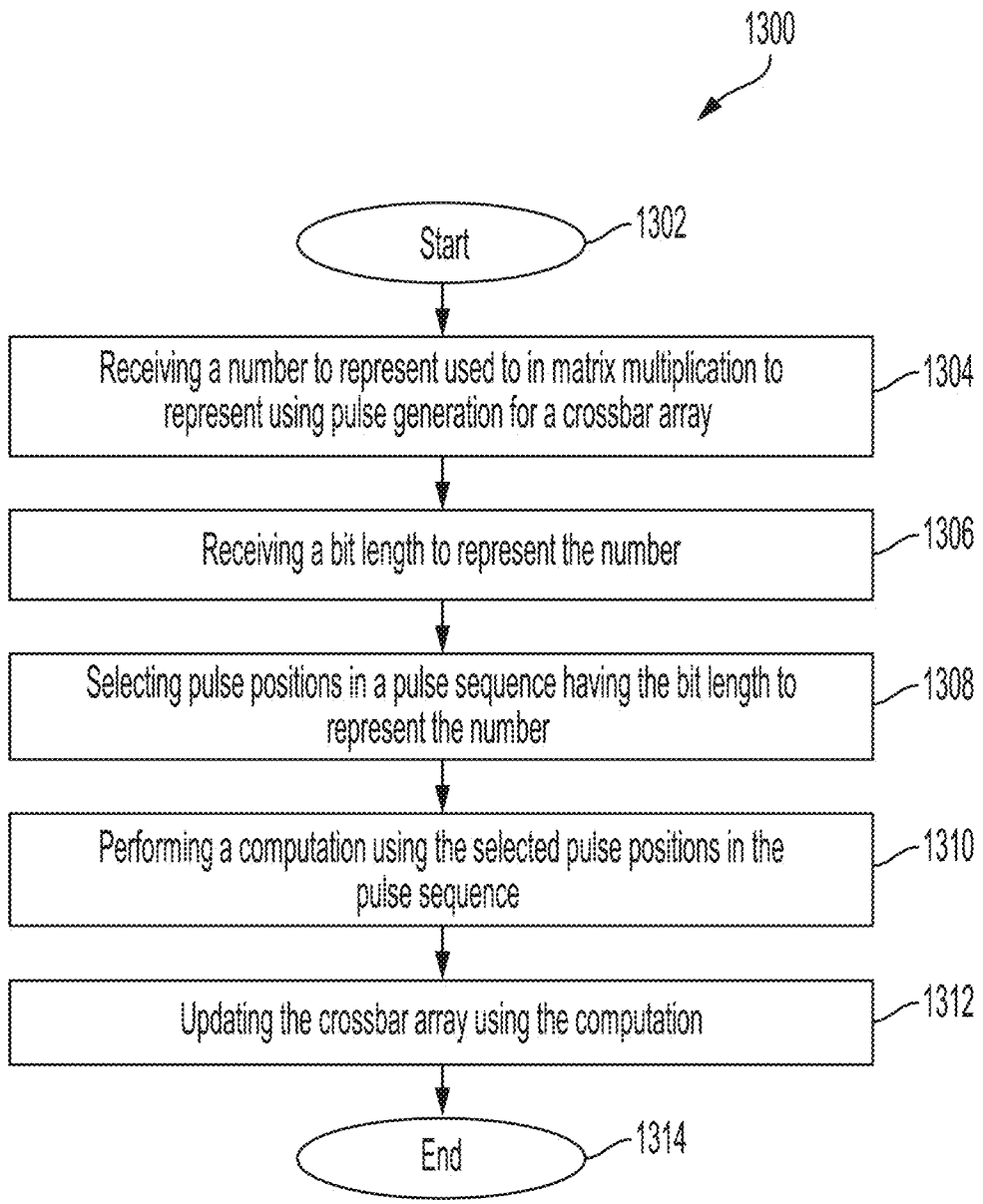
FIG. 13 depicts a flowchart of a method for generating pulses for updating crossbar arrays in accordance with one or more embodiments of the invention.

FIG. 13 depicts a flowchart of a method 1300 for pulse generation for updating a crossbar array in accordance with one or more embodiment of the invention. The method 1300 can be carried out using the processor such as that shown in FIG. 4 or the processor discussed with reference to FIG. 14. It should be understood that any other computing device can be used. The method 1300 begins at block 1302 and proceeds to block 1304 which provides for receiving, by a processor, a number used for matrix multiplication to represent using pulse generation for a crossbar array. Block 1306 receives a bit-length to represent the number. The bit length that is provided to the processor is known from the neural network. Block 1308 selects pulse positions in a pulse sequence having the bit length to represent the number. In one or more embodiments of the invention, the pulse positions are determined using the algorithm provided in FIG. 9. The pulse positions in a pulse sequence is determined for the δ value. Block 1310 performs a computation using the selected pulse positions in the pulse sequence. An outer product is determined for the first pulse sequence for the δ value and a second pulse sequence for an x value of a weight matrix. The result is used to either add or subtract the increment to adjust the weights for training the neural network. Block 1312 updates the crossbar array using the computation. In one or more embodiments of the invention, the result is used to adjust the conductance of one or more memristive devices in the crossbar array. The method 1300 ends at block 1314. It should be understood that a different sequence of steps or additional steps can be included in the method 1300 and is not intended to be limited by the steps shown in FIG. 13.

Figure 14:
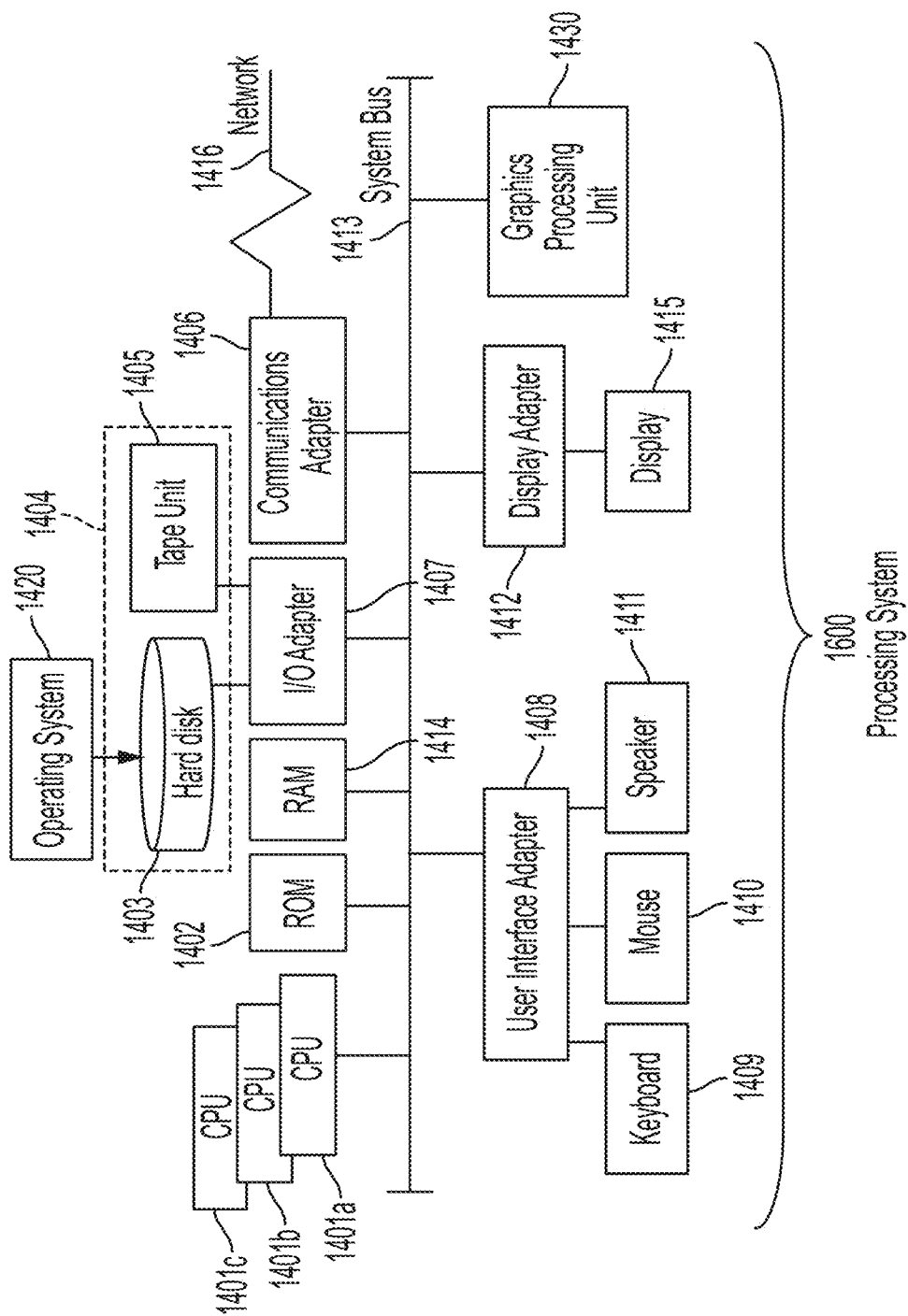
FIG. 14 depicts a block diagram illustrating one example of a processing system for practice of the teachings herein.

Referring to FIG. 14, there is shown a processing system 1400 for implementing aspects of the invention according to the teachings described herein. The processing system can be implemented in the processors (CPU/GPU cores) such as that shown in FIG. 4. In this embodiment, the system 1400 has one or more central processing units (processors) 1401a, 1401b, 1401c, etc. (collectively or generically referred to as processor(s) 1401). In one embodiment, each processor 1401 can include a reduced instruction set computer (RISC) microprocessor. Processors 1401 are coupled to system memory 1414 and various other components via a system bus 1413. Read only memory (ROM) 1402 is coupled to the system bus 1413 and can include a basic input/output system (BIOS), which controls certain basic functions of system 1400.

FIG. 14 further depicts an input/output (I/O) adapter 1407 and a network adapter 1406 coupled to the system bus 1613. I/O adapter 1407 can be a small computer system interface (SCSI) adapter that communicates with a hard disk 1403 and/or tape storage drive 1405 or any other similar component. I/O adapter 1407, hard disk 1403, and tape storage device 1405 are collectively referred to herein as mass storage 1404. Operating system 1420 for execution on the processing system 1400 can be stored in mass storage 1404. A network adapter 1406 interconnects bus 1413 with an outside network 1416 enabling data processing system 1400 to communicate with other such systems. A screen (e.g., a display monitor) 1415 is connected to system bus 1413 by display adaptor 1412, which can include a graphics adapter to improve the performance of graphics intensive applications and a video controller. In one embodiment, adapters 1407, 1406, and 1412 can be connected to one or more I/O busses that are connected to system bus 1413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1413 via user interface adapter 1408 and display adapter 1412. A keyboard 1409, mouse 1410, and speaker 1411 all interconnected to bus 1413 via user interface adapter 1408, which can include, for example, a Super I/O chip integrating multiple device adapters into a single integrated circuit.

In exemplary embodiments, the processing system 1400 includes a graphics processing unit 1430. Graphics processing unit 1430 is a specialized electronic circuit designed to manipulate and alter memory to accelerate the creation of images in a frame buffer intended for output to a display. In general, graphics processing unit 1430 is very efficient at manipulating computer graphics and image processing, and has a highly parallel structure that makes it more effective than general-purpose CPUs for algorithms where processing of large blocks of data is done in parallel.

Thus, as configured in FIG. 14, the system 1400 includes processing capability in the form of processors 1401, storage capability including system memory 1414 and mass storage 1404, input means such as keyboard 1409 and mouse 1410, and output capability including speaker 1411 and display 1415. In one embodiment, a portion of system memory 1414 and mass storage 1404 collectively store an operating system to coordinate the functions of the various components shown in FIG. 14.

The embodiments of the invention described herein improve over the prior art by determining the bit positions within a bit stream to represent each of the numbers used for multiplication for the neural network training. In addition, the embodiments of the techniques described herein provide for accelerating the training of the neural network using these methodologies by providing the initial values for the neural network prior to receiving any weight updates.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for pulse generation for updating analog crossbar arrays, the computer-implemented method comprising:
    receiving, by a processor, a number used in matrix multiplication to represent using pulse generation for a crossbar array;
    receiving, by the processor, a bit-length to represent the number;
    selecting, by the processor, pulse positions in a pulse sequence having the bit-length to represent the number;
    performing, by the processor, a computation using the selected pulse positions in the pulse sequence; and
    updating, by the processor, the crossbar array using the computation; wherein the selected pulse positions comprise at least one of a first pulse sequence or a second pulse sequence; and
    wherein there is a pulse coincidence between the first pulse sequence and the second pulse sequence.

2. The computer-implemented method of claim 1, wherein the computation comprises performing an outer product operation with the number used in the matrix multiplication and a second number used in the matrix multiplication.

3. The computer-implemented method of claim 1, wherein the selected pulse positions in the pulse sequence are based at least in part on the bit-length.

4. The computer-implemented method of claim 1, wherein the bit-length is equal to a number of different elements for a weight matrix.

5. The computer-implemented method of claim 1 further comprising generating a heat map, wherein the generated heat map is based at least in part on the pulse coincidence between the first pulse sequence and the second pulse sequence.

6. The computer-implemented method of claim 1, wherein the at least one first pulse sequence corresponds to the number and the second pulse sequence corresponds to the second number.

7. The computer-implemented method of claim 1 further comprising comparing a true multiplication map to the pulse coincidence using the selected pulse positions, wherein the true multiplication map performs an element-wise multiplication for each element.

8. The computer-implemented method of claim 7 further comprising:
    determining an error between the true multiplication map and the pulse coincidence; and
    displaying the error between the true multiplication map and the pulse coincidence.

9. The computer-implemented method 1, wherein updating the crossbar array comprises updating a conductance value of one or more memristive devices of the crossbar array based at least in part on the computation.

10. A system for implementing pulse generation for updating crossbar arrays, the system comprising:
    a crossbar array comprising one or more memristive devices;
    a processor configured to:
        receive a number used in matrix multiplication to represent using pulse generation for the crossbar array;
        receive a bit-length to represent the number;
        select pulse positions in a pulse sequence having the bit-length to represent the number;
        perform a computation using the selected pulse positions in the pulse sequence; and
        update the crossbar array using the computation, wherein updating the crossbar array changes weights of the one or more memristive devices;
        wherein the selected pulse positions comprise at least one of a first pulse sequence or a second pulse sequence; and
        wherein there is a pulse coincidence between the first pulse sequence and the second pulse sequence.

11. The system of claim 10, wherein the computation comprises performing an outer product operation with the number used in the matrix multiplication and a second number used in the matrix multiplication.

12. The system of claim 10, wherein the selected pulse positions in the pulse sequence are based at least in part on the bit-length.

13. The system of claim 10, wherein the bit-length is equal to a number of different elements for a weight matrix.

14. The system of claim 10, wherein the computation comprises determining the outer product of a first vector and a second vector for the neural network.

15. The system of claim 10, wherein the processor is further configured to generate a heat map, wherein the generated heat map is based at least in part on the pulse coincidence between the first pulse sequence and the second pulse sequence.

16. The system of claim 10 further comprising comparing a true multiplication map to the pulse coincidence using the selected pulse positions, wherein the true multiplication map performs an element-wise multiplication for each element.

17. The system of claim 16, wherein the process is further configured to:
    determine an error between the true multiplication map and the pulse coincidence; and
    display the error between the true multiplication map and the pulse coincidence.

18. The system of claim 10, wherein updating the crossbar array comprises updating a conductance value of the one or more memristive devices of the crossbar array based at least in part on the computation.

19. A computer program product for pulse generation for updating analog crossbar arrays, the computer program product comprising:
  a computer readable storage medium having stored thereon first program instructions executable by a processor to cause the processor to:
    receive a number used in matrix multiplication to represent using pulse generation for a crossbar array;
    receive a bit-length to represent the number;
    select pulse positions in a pulse sequence having the bit-length to represent the number;
    perform a computation using the selected pulse positions in the pulse sequence; and
    update the crossbar array using the computation, wherein updating the crossbar array comprises updating a conductance value of one or more memristive devices of the crossbar array based at least in part on the computation;
    wherein the selected pulse positions comprise at least one of a first pulse sequence or a second pulse sequence; and
    wherein there is a pulse coincidence between the first pulse sequence and the second pulse sequence generating a heat map.

20. The computer program product of claim 19, wherein the computation comprises performing an outer product operation with the number used in the matrix multiplication and a second number used in the matrix multiplication.

21. The computer program product of claim 19, wherein the bit-length is equal to a number of different elements for a weight matrix.

22. The computer program product of claim 19, wherein the instructions are further executable by a processor to cause the processor to determine the outer product of a first pulse sequence and a second pulse sequence for the neural network.

23. The computer program product of claim 19, wherein the instructions are further executable by a processor to cause the processor to generate a heat map, wherein the generated heat map is based at least in part on the pulse coincidence between the first pulse sequence and the second pulse sequence.

24. The computer program product of claim 19, wherein the instructions are further executable by a processor to cause the processor to compare a true multiplication map to the pulse coincidence using the selected pulse positions, wherein the true multiplication map performs an element-wise multiplication for each element.

25. The computer program product of claim 19, wherein the instructions are further executable by a processor to cause the processor to:
  determine an error between the true multiplication map and the pulse coincidence; and
  display the error between the true multiplication map and the pulse coincidence.

* * * * *